(12) United States Patent
Shimizu et al.

(10) Patent No.: US 6,600,877 B2
(45) Date of Patent: Jul. 29, 2003

(54) ZOOM INTERLOCKING MECHANISM FOR CAMERA

(75) Inventors: Motokazu Shimizu, Saitama (JP); Toru Ito, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/259,654

(22) Filed: Sep. 30, 2002

(65) Prior Publication Data

US 2003/0063905 A1 Apr. 3, 2003

(30) Foreign Application Priority Data

Sep. 28, 2001 (JP) ........................................ 2001-303744

(51) Int. Cl.[7] .......................... G03B 13/10; G03B 15/03
(52) U.S. Cl. .......................... 396/62; 396/84; 396/175; 396/379
(58) Field of Search .......................... 396/62, 84, 175, 396/378, 379, 38 D

(56) References Cited

U.S. PATENT DOCUMENTS

| 4,944,030 A | 7/1990 | Haraguchi et al. ............ 396/62 |
| 5,083,146 A * | 1/1992 | Ueda ............................ 396/62 |
| 6,072,954 A | 6/2000 | Onda ............................ 396/61 |

FOREIGN PATENT DOCUMENTS

| JP | 09-211554 | 8/1997 | ............ G03B/13/12 |
| JP | 10-186480 | 7/1998 | ............ G03B/17/00 |

* cited by examiner

*Primary Examiner*—W. B. Perkey
(74) *Attorney, Agent, or Firm*—Young & Thompson

(57) ABSTRACT

A cam plate is disposed horizontally and movably to a horizontal direction inside a camera body. The cam plate includes a plate portion for moving variator lenses of a zoom finder device in cooperation with a zoom lens to vary a viewable field angle of a zoom finder device, and a rack gear formed integrally with the plate portion. The rack gear is engaged with an intermediate gear. A first flat gear being concentric with the intermediate gear is engaged with a second flat gear. Two flash rack gears are engaged with the first and second flat gears. These flash rack gears are formed in a frame holding a flash projector. When the zoom lens moves, the cam plate moves horizontally to vary the viewable field angle of the zoom finder device, and simultaneously the rack gear rotates the first and second flat gears.

9 Claims, 6 Drawing Sheets

ZOOM INTERLOCKING MECHANISM FOR CAMERA

BACKGROUND OF THE INVENTION

1. Field of the Invention

The present invention relates to a zoom interlocking mechanism which varies a viewable field angle of a zoom finder device and an illuminating angle of a flashlight in cooperation with a zoom lens assembly.

2. Background Arts

A camera with a zoom lens assembly usually has a zoom finder device. In the zoom finder device, variator lenses move simultaneously with zooming of the zoom lens assembly in order to vary a viewable field angle of the zoom finder device. Also is known a zoom flash device which varies an illuminating angle of a flashlight in cooperation with the zooming of the zoom lens assembly, in order to make efficient use of the flashlight even when the zooming changes photographic field angle.

A zoom interlocking mechanism, which is disclosed in Japanese Laid-Open Patent Application No. 10-186480 (corresponding to U.S. Pat. No. 6,072,954), is provided with an arc-shaped gear and a cam disposed along a periphery of a movable lens barrel rotated with zooming. With the arc-shaped gear is engaged a drive gear for rotating the movable lens barrel and a gear train for moving a flash projector in a zoom flash device back and forth. There is provided a pair of flat gears engaged with each other in a basic portion of the flash projector. Both outer sides of the flat gears are engaged with a pair of rack gears formed in inner walls of a frame of the flash projector. One of the flat gears is engaged with an output gear of the gear train. Rotation of the movable lens barrel transmitted through the gear train rotates the pair flat gears in opposite directions each other, so that the flash projector is moved back and forth in an optical axis direction through the pair rack gears. Also the cam in the movable lens barrel moves variator lenses in a zoom finder device. Thus, an illuminating angle of the zoom flash device and a viewable field angle of the zoom finder device are changed at the same time in cooperation with the rotation of the lens barrel.

In the above zoom interlocking mechanism a gear train having a lot of gears is provided between the periphery of the movable lens barrel and the flash projector. Therefore, the zoom interlocking mechanism makes a camera high cost and large size because of an installation space for the gear train. There is a disadvantage in that the interlocking mechanism cannot be applied to a compact and low cost camera.

SUMMARY OF THE INVENTION

An object of the present invention is to provide a zoom interlocking mechanism at low cost which has a simple structure so as to be disposed in small space.

To achieve the above and other objects, a zoom interlocking mechanism according to the present invention comprises a zoom lens assembly having a zoom lens optical system which moves back and forth in an optical axis direction for varying a focal length thereof system; a zoom finder device holding plural variator lenses which are movable in the optical axis direction; a flash projector installed movably in the optical axis direction; and a cam plate which is disposed horizontally inside a camera, and movable in a direction of perpendicular to the optical axis and horizontal to the camera.

The cam plate comprises a rectangular plate portion and a rack gear formed integrally with the plate portion. A groove used for interlock with a lens barrel is formed in one surface of the plate portion, and grooves used for interlock with the variator lenses for changing a viewable field angle of the zoom finder device are formed in the other surface. The rack gear extends to a moving direction of the cam plate, and has the same thickness as the plate portion. The rack gear rotates plural flat gears. These flat gears are engaged with other rack gears formed in the flash projector so as to vary a position of the flash projector.

According to the present invention, it is possible to compose the zoom interlocking mechanism in the simple structure which varies the viewable field angle of the zoom finder device and an illuminating angle of a flashlight in cooperation with zooming. Moreover, because the cam plate can be formed in a thickness of approximately 1 mm, it is possible to dispose the zoom interlocking mechanism in small space. The present invention will help miniaturization of the camera.

BRIEF DESCRIPTION OF THE DRAWINGS

The above and other objects and advantages of the present invention will become apparent from the following detailed description of the preferred embodiment when read in association with the accompanying drawings, which are given by way of illustration only and thus are not limiting the present invention. In the drawings, same reference numerals designate like or corresponding parts throughout the several views, and wherein.

DETAILED DESCRIPTION OF THE EMBODIMENTS

Figure 1A:
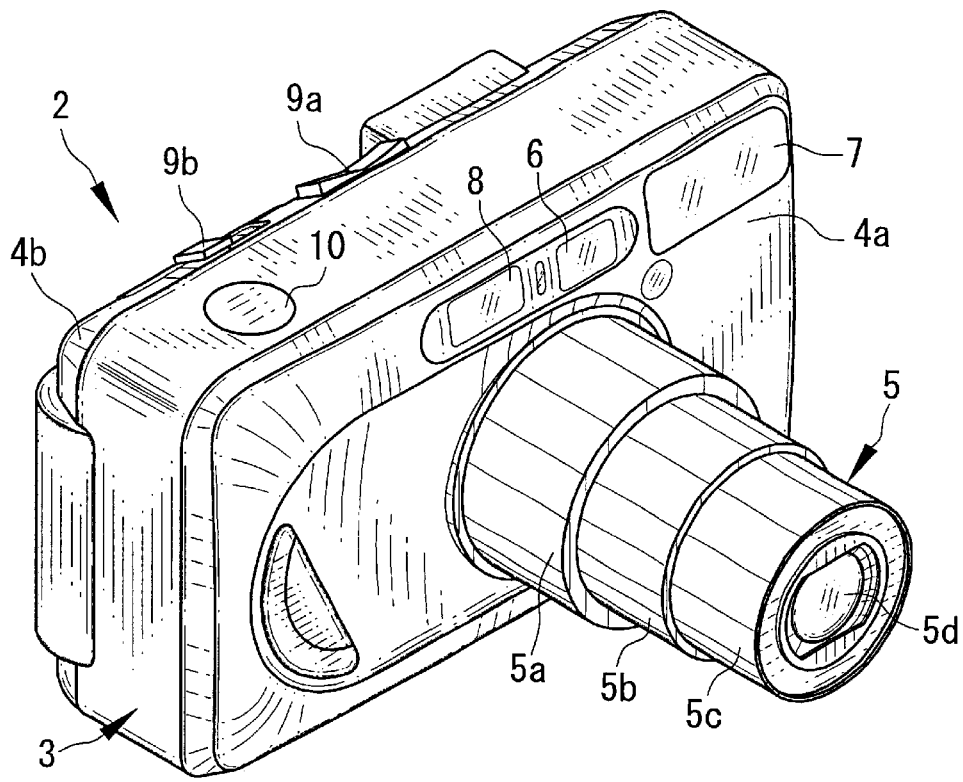
FIG. 1A is a front perspective view of a camera showing a condition in which a zoom lens assembly is protruded.
Figure 1B:
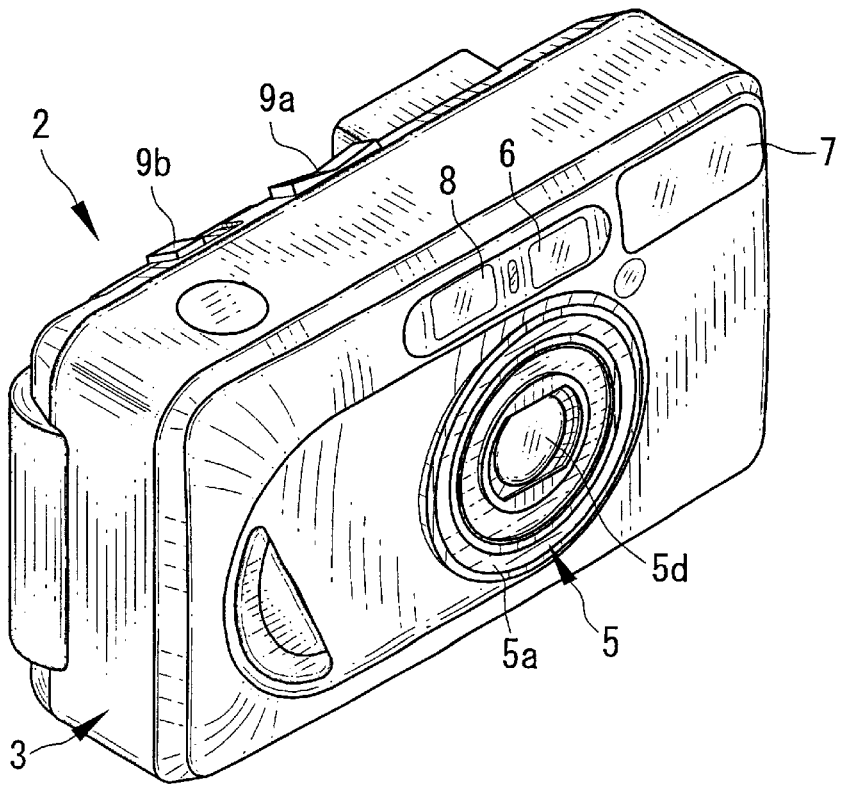
FIG. 1B is a front perspective view of a camera showing a condition in which a zoom lens assembly is collapsed.

Referring to FIGS. 1A and 1B, a camera 2 comprises a camera body 3 and a zoom lens assembly 5 (hereinafter referred to as a zoom lens). The camera body 3 has a main body 11 (refer to FIG. 2), and a front cover 4a and a rear cover 4b which are attached on the main body 11. To the rear cover 4b a lid (not-illustrated) for loading a photo film (not-illustrated) is hinged. There are provided a zoom finder device 6, a zoom flash device 7, and a range finding window 8 in an upper side of the camera body 3. Also in the camera body 3, there are provided a seesaw-type zoom switch lever 9a, a power switch 9b, and a release button 10.

The zoom lens 5 has a first, second and third movable lens barrels 5a to 5c and a zoom lens optical system 5d. A screw axis and a guide bar (Neither illustrated) extending to an optical axis L direction (refer to FIG. 2) penetrate the first movable lens barrel 5a. When the power switch 9b is turned on, a zoom motor (not-illustrated) rotates in normal direction so as to rotate the screw axis. The screw axis moves the first to third movable lens barrels 5a to 5c from a collapsed position shown in FIG. 1B to a widest-angle position which protrudes a little from the camera body 3. When pressing the zoom switch lever 9a to a telephoto side, the zoom motor further rotates in the normal direction so as to protrude the first to third movable lens barrels 5a to 5c along the optical axis L to the most telephoto position shown in FIG. 1A. When pressing the zoom switch lever 9a to a wide-angle side, the zoom motor rotates in the reverse direction so as to retract the first to third movable lens barrels 5a to 5c to the widest-angle position. When the power switch 9b is turned off, the first to third movable lens barrels 5a to 5c retract to the collapsed position shown in FIG. 1B.

A gear fixed to an end of the screw axis is engaged with a helicoid gear provided in a periphery of the second movable lens barrel 5b. The second movable lens barrel 5b is helicoid-connected to the first movable lens barrel 5a. The zoom motor rotates the screw axis, the first movable lens barrel 5a goes straight along the optical axis L without rotation following a guide of the guide bar. On the other hand, the second movable lens barrel 5b advances from the first movable lens barrel 5a with rotation.

The third movable lens barrel 5c is connected to the second movable lens barrel 5b through a cam mechanism. The third movable lens barrel 5c is also connected to an anti-rotation member which extends from the first movable lens barrel 5a. When the zoom motor rotates the second movable lens barrel 5b, the third movable lens barrel 5c advances along the optical axis L from the second movable lens barrel 5b without rotation.

The zoom lens optical system 5d is fitted into the third movable lens barrel 5c. The zoom lens optical system 5d is composed of a front group and a rear group which move together so as to zoom in and out. The zoom lens 5 is a step zoom, and zooms and focuses alternatively during the rotation of the zoom motor. In focusing, the rear group moves relatively to the front group.

Figure 2:
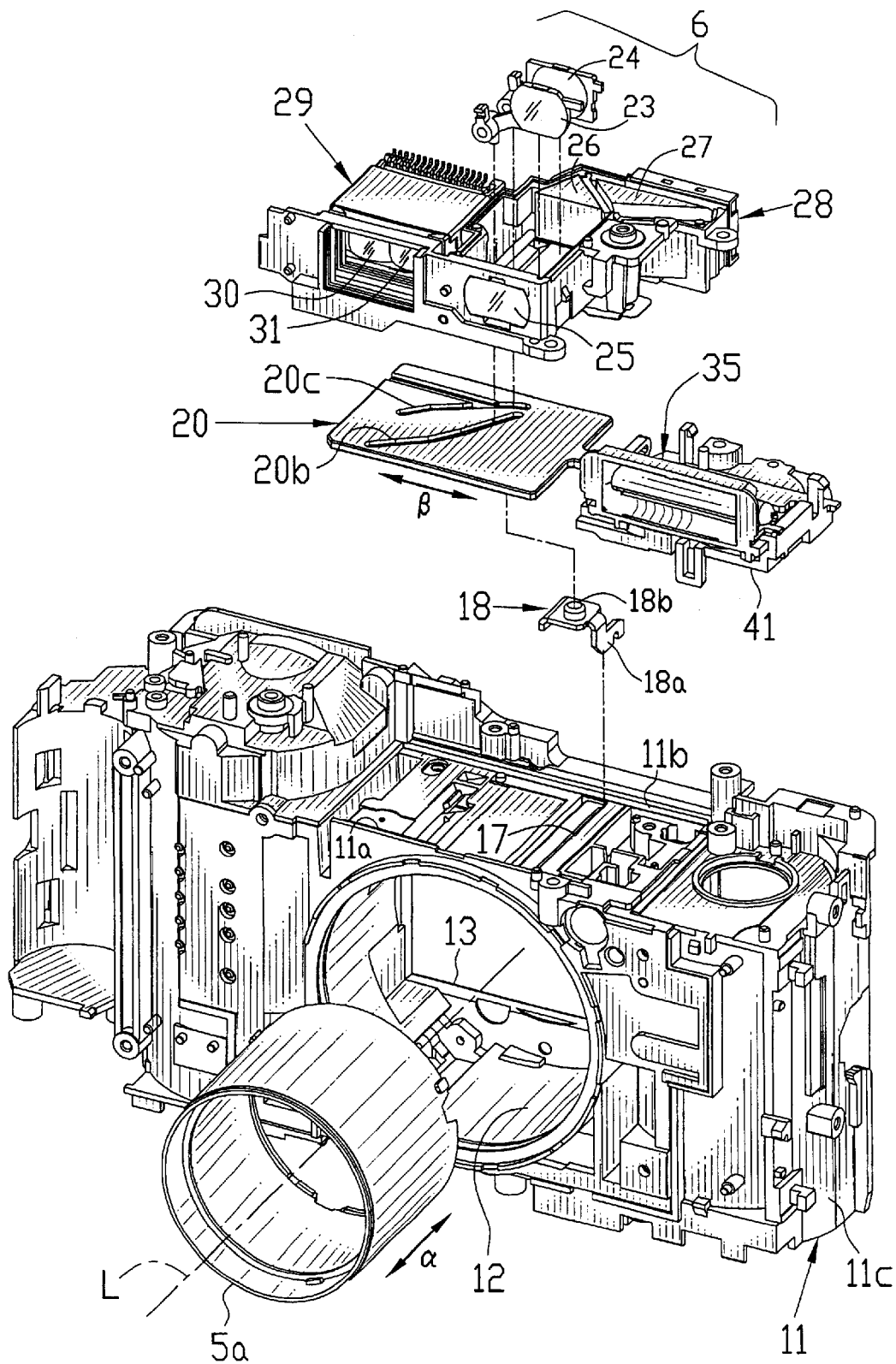
FIG. 2 is an exploded perspective view showing substantial portions of the present invention.

Referring to FIG. 2, a cylindrical opening 12 is formed in the middle of the main body 11 of a camera. In a rear side of the main body 11, is formed an exposure aperture 13 which decides an exposure field on the photo film disposed behind. The first movable lens barrel 5a is movably contained in the opening 12.

There is a slit 17 formed in parallel with the optical axis L in an upper side of the main body 11. Through the slit 17, an engaging claw 18a protrudes to engage with a part of a periphery of the first movable lens barrel 5a. On the other hand, on the top of the engaging claw 18a a protrusion 18b is formed. The protrusion 18b is movably fitted into a cam groove 20a (refer to FIG. 2) formed in a rear side of a rectangular cam plate 20.

The cam plate 20 moves horizontally, namely in a horizontal direction β which is perpendicular to the optical axis direction α, with a guide of a pair of guide ribs 11a and 11b. The cam plate 20 has a thickness of approximately 1 mm. The groove 20a, as shown in FIG. 2, is formed oblique against the optical axis direction α, so that when the first movable lens barrel 5a moves in the optical axis direction α the cam plate 20 moves in the horizontal direction β through the connecting member 18.

Two cam grooves 20b and 20c are formed in a front surface of the cam plate 20. Into the cam grooves 20b and 20c, two variator lenses 23 and 24 of the zoom finder device 6 are fitted respectively. The zoom finder device 6 comprises an objective lens 25, prisms 26 and 27, an eyepiece lens (not-illustrated), and the like besides the variator lenses 23 and 24. When the cam plate 20 moves in the horizontal direction β and the variator lenses 23 and 24 move along the cam grooves 20b and 20c respectively, a viewable field angle of the zoom finder device 6 is varied in response to a focal length of the zoom lens 5.

In this way the cam groove 20a used for interlock with the first movable lens barrel 5a is formed in the rear surface of the cam plate 20, and the cam grooves 20b and 20c used for interlock with the variator lenses 23 and 24 of the zoom finder device 6 are formed in the front surface, and furthermore the cam plate 20 moves in the horizontal direction β. Therefore, since space of the vertical direction required for interlock between the first movable lens barrel 5a and the zoom finder device 6 is just the thickness of the cam plate 20 (approximately 1 mm), it is possible to contribute to miniaturization of the camera 2.

The zoom finder device 6 and a passive-type automatic focus unit 29 constitute a finder unit 28 which is installed on the upper side of the main body 11. In the automatic focus unit 29, AF light receiving windows 30 and 31 are provided behind the range finding window 8.

Figure 3:
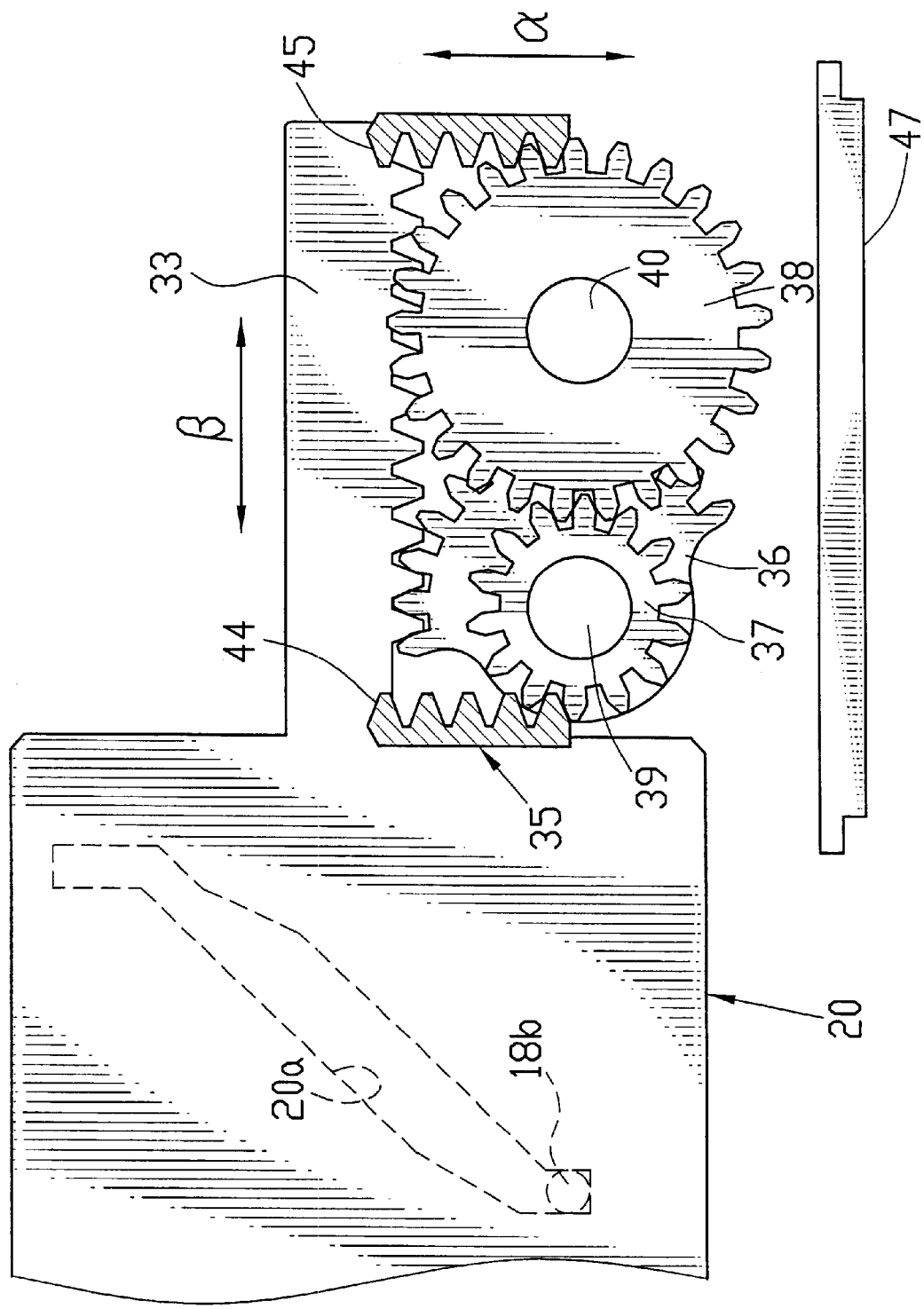
FIG. 3 is an explanatory drawing showing a physical relationship between a rack gear of a cam plate and flash rack gears in the most telephoto position.

Referring to FIG. 3, is integrally formed a rack gear 33 having the same thickness as the cam plate 20 and extending to the horizontal direction β from around the middle of one shorter side of the cam plate 20. The rack gear 33 is engaged with a flat gear 36 which moves a flash projector 35 (refer to FIGS. 2 and 6) of the zoom flash device 7 back and forth in the optical axis direction α.

Figure 4:
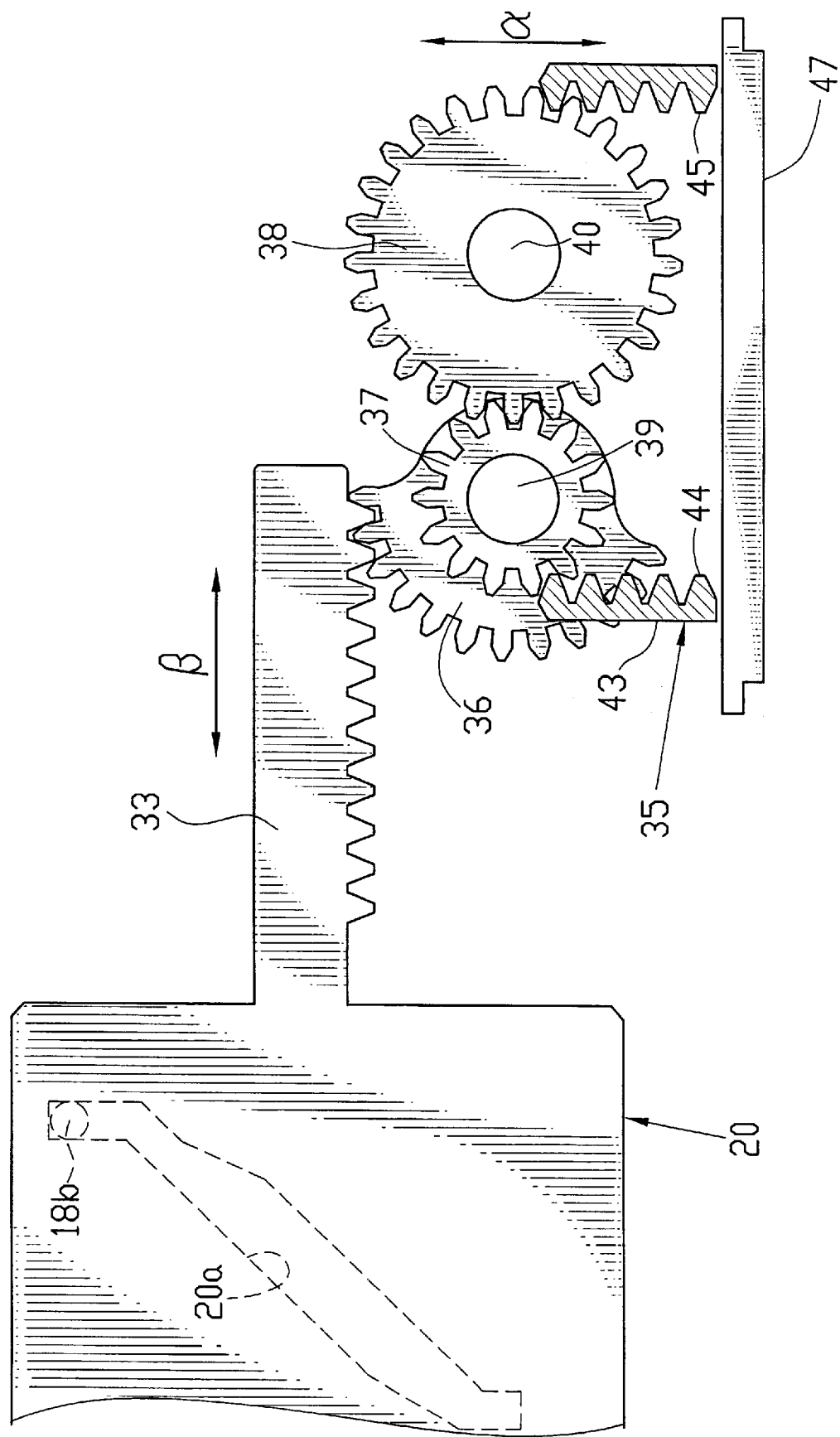
FIG. 4 is a similar drawing to FIG. 3 in the widest-angle position.
Figure 5:
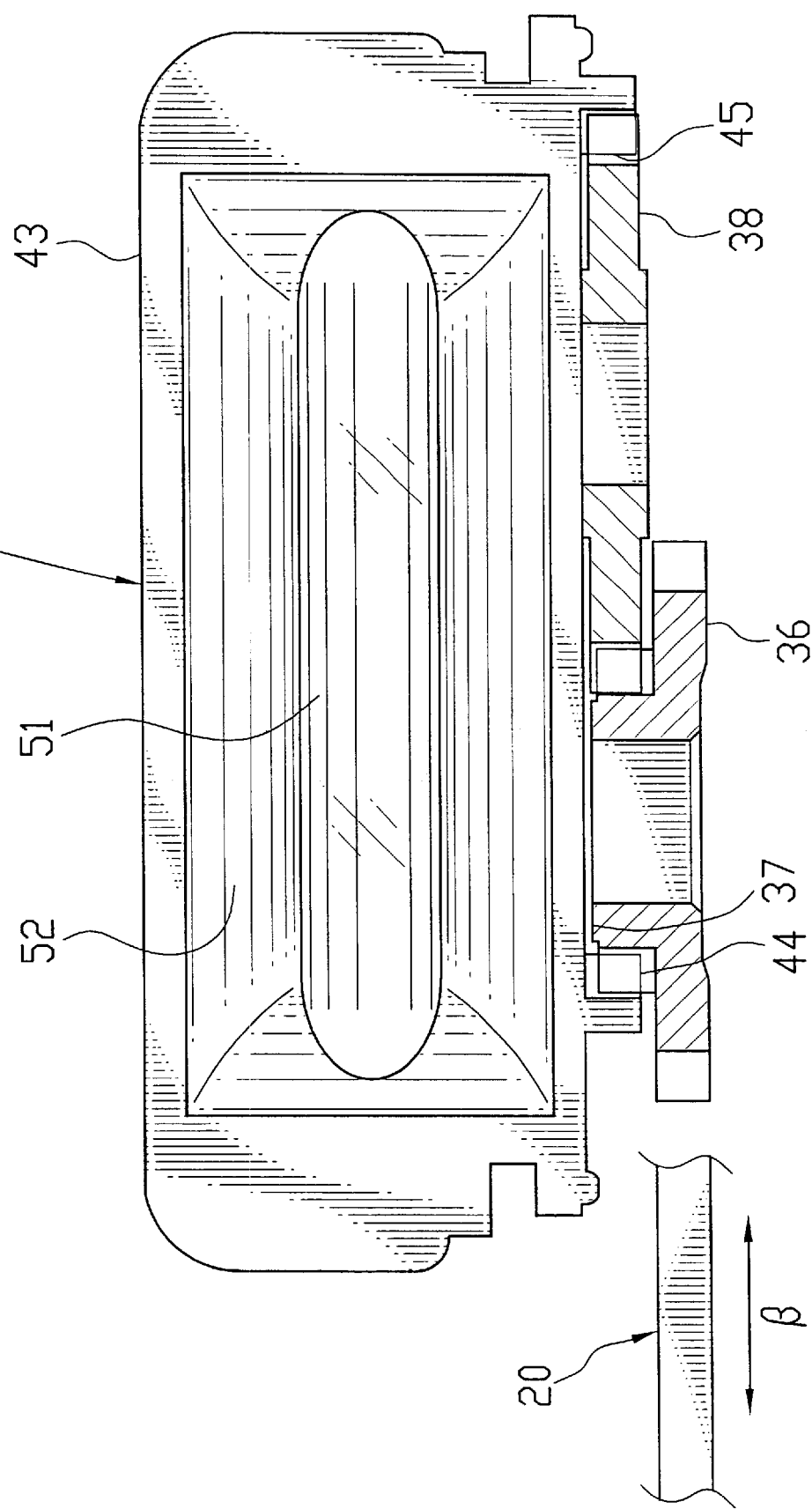
FIG. 5 is a front view of a flash projector.

Referring to the FIG. 5, a flat gear 37 having a smaller diameter than the flat gear 36 is formed on the flat gear 36. The gears 36 and 37 are movably fitted to an axis 39, and a gear 38 is movably fitted to another axis 40. The gears 37 and 38 are engaged each other. Also the gears 37 and 38 are engaged with flash rack gears 44 and 45 formed in inner walls of a movable frame 43 of the flash projector 35, respectively. When the rack gear 33 moves in the horizontal direction β, the movable frame 43 moves back and forth in the optical axis direction α. Thus, a distance between the flash projector 35 and an optical panel, e.g. a Fresnel lens 47, varies, so that an illuminating angle of a flashlight varies between the most telephoto position shown in FIG. 3 and the widest-angle position shown in FIG. 4. As is well known, the Fresnel lens 47 having a Fresnel surface in its rear side regulates the illuminating angle of the flashlight.

The axis 39 and 40 are perpendicularly provided to a flash basic portion 41 on which the flash projector 35 is movably fitted. The basic portion 41 is attached to a top of a film winding chamber 11c formed in the main body 11 with engagement of a claw. In the gear 36 a part of a cutoff is formed so as not to touch the cam plate 20.

Figure 6:
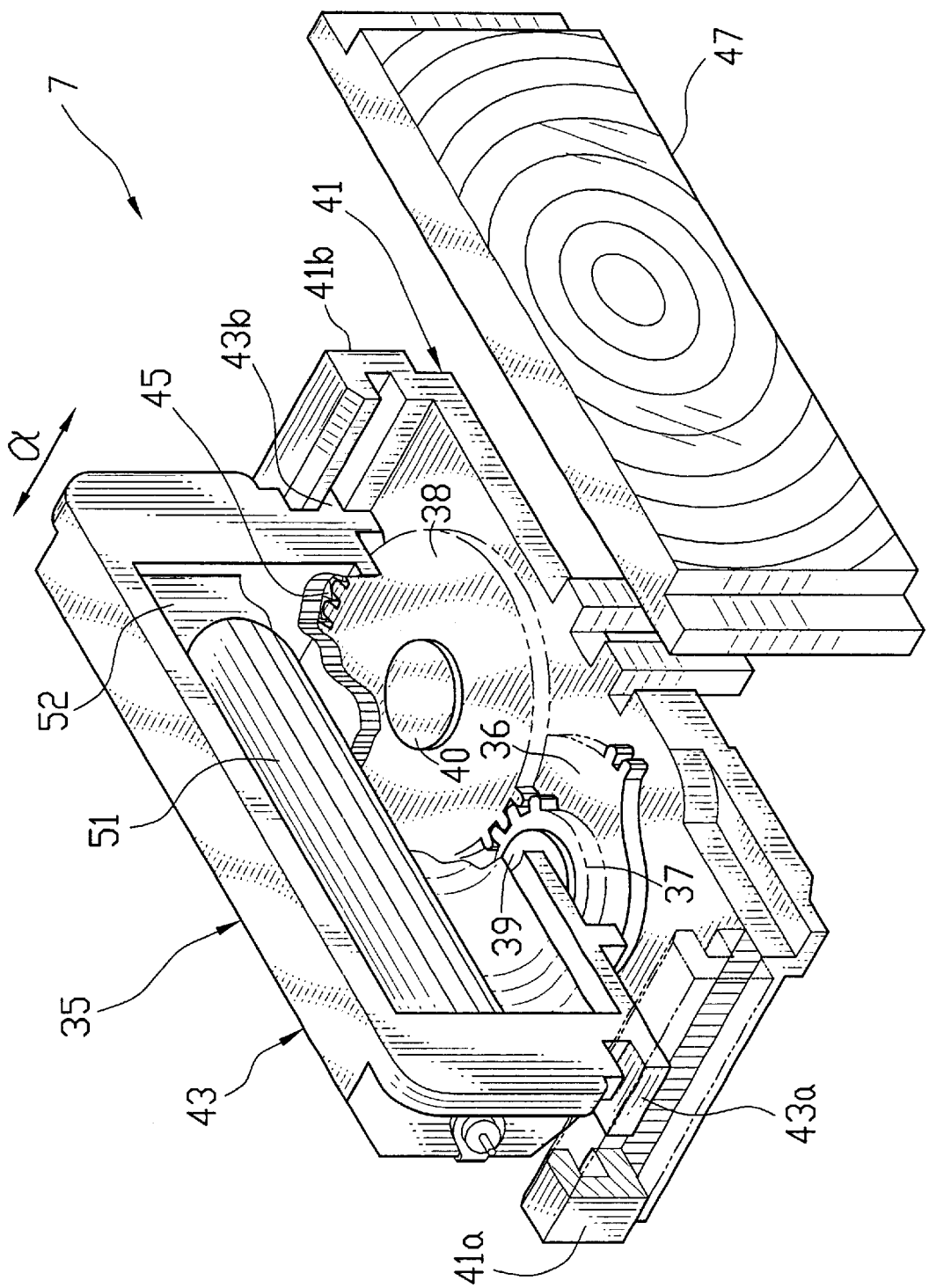
FIG. 6 is a perspective view showing main portions of the flash projector.

Referring to FIG. 6, there are provided ridges 43a and 43b in outer walls of the movable frame 43. In both sides of the flash basic portion 41, guide rails 41a and 41b for guiding the ridges 43a and 43b respectively are formed. Thus, the frame 43 is movably fitted onto the flash basic portion 41 along the guide rails 41a and 41b in the optical axis direction α.

The flash projector 35 comprises a flash discharge tube 51 for emitting the flashlight, a flashlight reflector 52 for reflecting the flashlight forward, and the movable frame 43 holding the flash discharge tube 51 and the flashlight reflector 52. The zoom flash device 7 comprises the flash projector 35 and a flash substrate (not-illustrated) on which a flash circuit is formed. The zoom flash device 7 starts charging electricity in turning on the power switch 9b, and emits the flashlight automatically along with actuation of a shutter in case of photography in a dark place.

Now operation of the present invention will be described below. When the power switch lever 9b is turned on, the zoom lens 5 moves from the collapsed position shown in FIG. 1B to the widest-angle position. In operating the zoom switch lever 9a to the telephoto side, the movable lens barrels 5a to 5d advance forward along the optical axis L, so that the focal length and also magnification of the zoom finder device 6 vary.

At the time, the connecting member 18 engaged with the first movable lens barrel 5a moves backward in the main body 11 together with the first movable lens barrel 5a. The protrusion 18b presses an inner wall of the cam groove 20a to move the cam plate 20 away from the flash projector 35 in the horizontal direction β (leftward in FIG. 3).

Operating the zoom switch lever 9a to the side, the first to third movable lens barrels 5a to 5c are retracted from a telephoto position. Accordingly, the magnification of the zoom finder device 6 becomes low.

The cam grooves 20b and 20c formed in the front surface of the cam plate 20 move the variator lenses 23 and 24 to their respective positions corresponding to the focal length of the zoom lens 5, so that the viewable field angle of the zoom finder device 6 is varied. At the same time, the rack gear 33 of the cam plate 22 rotates the gear 36 in a counterclockwise direction. The gear 37 formed integrally with the gear 36 rotates counterclockwise, so the gear 38 engaged with the gear 37 rotates in a clockwise direction. Because the gears 37 and 38 are engaged with the flash rack gears 44 and 45 of the movable frame 43, as shown in FIG. 4, the movable frame 43 moves toward the Fresnel lens 47 in order to widen the illuminating angle of the flashlight of the zoom flash device 7.

When the zoom switch lever 9a is operated from the wide-angle side to the telephoto side, on the other hand, the first movable lens barrel 5a protrudes forward and the cam plate 20 moves in a direction of the flash projector 35. Therefore, the magnification of the zoom finder device 6 becomes high, and also the flash projector 35 moves away from the Fresnel lens 47 so that the illuminating angle of the flashlight of the zoom flash device 7 becomes narrow.

In the above embodiment, the thickness of the cam plate 20 is approximately 1 mm, but the present invention is not limited to it. The thickness of the cam plate 20 maybe thicker or thinner.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A zoom interlocking mechanism for a camera, said camera having a zoom lens assembly for varying a focal length by means of moving a lens barrel straight in an optical axis direction, a zoom finder device for varying a viewable field angle, and a zoom flash device for varying an illuminating angle of a flashlight, said zoom interlocking mechanism comprising:

a cam plate being movable in a direction of perpendicular and horizontal to said optical axis in cooperation with straight movement of said lens barrel;

a first cam groove formed in said cam plate, said first cam groove actuating said zoom finder device in order to vary said viewable field angle;

a first rack gear integrally formed with said cam plate; and plural gears for transmitting movement of said first rack gear to said zoom flash device, rotation of said gears varying said illuminating angle of said flashlight.

2. A zoom interlocking mechanism as recited in claim 1, wherein said cam plate has a rectangular plate portion extending to the moving direction thereof.

3. A zoom interlocking mechanism as recited in claim 2, wherein said first rack gear protrudes from said plate portion to the moving direction of said cam plate and has the same thickness as said plate portion.

4. A zoom interlocking mechanism as recited in claim 3, wherein said cam plate has a top surface and an under surface, in said top surface said first cam groove being formed, in said under surface a second cam groove being formed, said second cam groove moving said cam plate in cooperation with the straight movement of said lens barrel.

5. A zoom interlocking mechanism as recited in claim 4, further comprising a connecting member connected to said lens barrel, a part of said connecting member being fitted into said second cam groove.

6. A zoom interlocking mechanism as recited in claim 5, wherein said zoom flash device comprises:

a flash projector being movable in said optical axis direction by means of the rotation of said plural gears;

an optical panel disposed in front of said flash projector, said flash projector moving toward or away from said optical panel so that said illuminating angle of said flashlight is varied.

7. A zoom interlocking mechanism as recited in claim 6, wherein said flash projector comprises:

a flash discharge tube for emitting said flashlight;

a flashlight reflector for reflecting said flashlight forward;

a frame for holding said flash discharge tube and said flashlight reflector, said frame being movable in said optical axis direction; and a second rack gear formed in inner walls of said frame, movement of said first rack gear being transmitted to said second rack gear through said plural gears so as to move said frame along said optical axis.

8. A zoom interlocking mechanism as recited in claim 7, further comprising:

a flash base for movably supporting said frame;

plural axes provided on said flash base, said plural gears being rotatably attached with said axes.

9. A zoom interlocking mechanism as recited in claim 8, wherein said zoom finder device has at least one variator lens for varying said viewable field angle, said variator lens being moved in said optical axis direction by said first cam groove.

* * * * *